Patented Aug. 2, 1938

2,125,386

UNITED STATES PATENT OFFICE 2,125,386

COATING ALKALINE SURFACES

Paul La Frone Magill, Ransomville, N. Y., assignor to E. I. du Pont de Nemours & Company, Wilmington, Del., a corporation of Delaware No Drawing. Application February 17, 1937, Serial No. 126,257

12 Claims. (Cl. 91—70)

This invention relates to an improved method of coating and impregnating alkaline surfaces. More particularly, it relates to an improved coating and impregnating agent which is stable in contact with such surfaces and which possesses other highly desirable properties. The invention also relates to the novel products that are produced when articles having an alkaline surface are coated with my novel coating agent.

Marble, as it is mined, is too light and bright in color for many purposes to present desirable architectural appearances. One attempt to remedy this defect of marble has consisted in impregnating marble with oils or waxes. This method has not been satisfactory because it leaves the marble with an objectionable greasy surface. Another method suggested for overcoming the difficulty consists in coating or impregnating marble with resins generally admixed with a drying oil, e. g., linseed or tung oil. This method is not entirely satisfactory since the resins and drying oils normally available for this purpose are sensitive to alkaline surfaces.

The problem of coating cement products for the purpose of rendering them water-impervious and water-repellent has likewise never been entirely satisfactorily solved. The surfaces of such products are alkaline and tend to saponify the commercially available drying oils and to adversely affect many resins which would otherwise be usable for this purpose.

One object of the present invention is to provide an improved method of coating or impregnating alkaline surfaces, wherein a coating or impregnating agent is employed which is not adversely affected by contact with alkaline surfaces and which possesses other highly desirable properties. Another object is the provision of a method for improving the surface characteristics of marble, cement products, and the like articles, wherein such surfaces are coated or impregnated with an improved coating material. A further object is to provide novel marble products, cement products, and like articles which are obtainable by the above process, and which articles have certain novel and desirable characteristics. Other objects will be hereinafter apparent.

The above objects are accomplished in accordance with the present invention by coating or impregnating articles having an alkaline surface with abietyl alcohol, or with a composition which contains a substantial amount of abietyl alcohol. I have discovered that abietyl alcohol is not adversely affected by contact with alkaline surfaces, e. g., surfaces of marble and cement products. In addition to this important property, it is light-stable, i. e., is not darkened by sunlight, and "dries" to a hard flexible film when coated on marble, cement or other alkaline surfaces. As examples of articles having an alkaline surface which may be advantageously coated or impregnated with abietyl alcohol in accordance with my invention, I mention the following: marble, cement products, paper and similar materials which have been sized with an alkaline sizing agent, e. g., calcium carbonate, galvanized metal articles, and the like.

Abietyl alcohol, having the empirical formula $C_{20}H_{32}O$, may be obtained by the reduction of methyl abietate with sodium in alcohol (see "Chemisches Zentralblatt", 1922, III, 672). It is a light yellow viscous liquid at ordinary temperature which boils at 180–190° C. at 1–3 mm. pressure. It is generally obtained as a mixture of isomers corresponding to the isomeric mixture of acids occurring in rosin. Its property of drying in contact with air to produce hard flexible films appears to be associated with the presence in the compound of two conjugated double bonds. If the material is hydrogenated, e. g., to dihydroabietyl alcohol, this drying characteristic is greatly reduced and the hydrogenated product is not useful for the present purposes. Other abietyl alcohol derivatives are likewise not suited for use as coating materials for alkaline surfaces. For example, esters of abietyl alcohol have a tendency to saponify when in contact with such surfaces so that the adherence to and general appearance of such coatings on alkaline surfaces are altered upon long standing.

The term "cement products" is used in the specification and in the appended claims to mean the stone-like products formed when mortar, containing lime or calcined mixtures of clay and limestone become set, or similar articles which have an alkaline surface. The term "articles having an alkaline surface" is used to mean those articles whose surfaces are sufficiently alkaline in reaction as to saponify, at least partially, fatty acid glycerol esters, e. g. natural vegetable oils, upon long contact of such esters with the surfaces of the article whereby adhesion of the ester to the article is decreased, or the appearance of the ester on the article is altered.

I have found that abietyl alcohol possesses certain properties which make it especially well suited for use as a coating or impregnating agent for articles having an alkaline surface. As has been mentioned above, abietyl alcohol is unaffected by contact with alkaline surfaces such as those afforded by marble whose alkalinity corresponds roughly to a pH value of 9. In addition, abietyl alcohol possesses important drying properties so that it becomes hard and flexible upon exposure to air. In view of this characteristic, any of the common drying agents may be employed in conjunction with abietyl alcohol for the purpose of hastening its drying. Abietyl alcohol is light-stable, i. e., it does not darken in sun light, and its hardened films are water-impervious and water-repellant. Coatings of abietyl alcohol provide effective protection against normal weathering conditions.

Abietyl alcohol may be applied to alkaline surfaces in accordance with my invention in any of several manners. If it is desired to effect the application at ordinary temperatures by means of a brush, spray, or by dipping, I prefer to dilute the substance with any of the common solvents such as alcohol, xylene, benzene, etc. The use of volatile solvents is sometimes undesirable. Under such circumstances, the fluidity of abietyl alcohol may be effectively increased by the use of higher temperatures instead of using volatile solvents at room temperature. Abietyl alcohol is sufficiently fluid for most purposes at temperatures in the neighborhood of 100° C. The avoidance of the use of a volatile solvent obviates the necessity of removing the solvent subsequent to the coating treatment and produces a more uniform and continuous film.

I have discovered that the appearance of marble for achitectural purposes may be greatly improved by impregnating it with abietyl alcohol. Marble so impregnated has improved optical properties in that it takes on a less bright or glaring appearance and closely resembles marble that has been wet with a colorless liquid such as water. Since the alkalinity of the marble does not adversely affect the abietyl alcohol, and since the abietyl alcohol becomes hard yet remains flexible upon drying, marble so treated is practically permanently resistant to weathering conditions and is more desirable for numerous architectural and other uses. If colored marble products are desired, oil-soluble coloring agents or dyes may be used in conjunction with the abietyl alcohol to produce marble products of the desired color.

I prefer to impregnate marble by contacting the surface to be treated with abietyl alcohol maintained at a temperature of 90° to 125° C. At such a temperature, the alcohol is sufficiently fluid to permit the obtainment of impregnation in the order of ½ inch in 16 hours or less. If more rapid impregnation, or impregnation at a lower temperature is desired, solvents may be employed in conjunction with the abietyl alcohol. Volatile solvents may be employed to reduce the viscosity and increase the rate of penetration into the marble. I prefer, however, to avoid the use of such solvents in order to obviate the necessity of a separate drying operation to accomplish the removal of such solvents subsequent to the impregnating operation. Oils such as linseed oil and tung oil may be used as diluents, but since these oils are saponifiable, they should be used sparingly, otherwise adhesion of the coating to the alkaline surface may be seriously impaired.

It is frequently desirable to paint articles having zinc surfaces, e. g., galvanized iron products. The paint or coating compositions normally employed for this purpose generally contain saponifiable or alkali-sensitive ingredients and, therefore, such compositions do not form a permanently adhesive bond with the alkaline galvanized surface. This difficulty may be overcome in accordance with my invention by coating the galvanized surface first with a film of abietyl alcohol which, when dry, affords a surface to which paint or similar compositions may be effectively applied. In this adaptation of my invention, the abietyl alcohol forms an effective bond with the alkaline galvanized surface on one side and with the film of paint on the other so that the paint is indirectly firmly bonded to the surface of the galvanized article.

Any of the driers commonly used with drying oils may be employed in conjunction with abietyl alcohol in accordance with my invention. I prefer to employ the well known oil-soluble driers since they are soluble in abietyl alcohol. Abietyl alcohol dries at a sufficiently rapid rate in contact with marble so that when coating marble, the addition of a drier is not generally required.

While it is generally preferable to avoid the use of saponifiable substances in admixture with abietyl alcohol as a diluent or solvent, such substances may be used so long as the quantity employed is not excessive. It will also be appreciated that abietyl alcohol may be used effectively in coating compositions as a substitute for a part or all of the linseed oil or other similar alkali-sensitive drying oils normally contained in such compositions, for the purpose of decreasing or eliminating the sensitivity of the composition to alkaline surfaces.

My invention is not restricted to the precise procedural steps described, or to the coating of the specific articles herein mentioned. My invention may be practiced with excellent results to coat articles in general which have alkaline surfaces. Obviously, the manner in which abietyl alcohol, or a composition containing a substantial quantity of abietyl alcohol, is applied to such surfaces may be varied widely without departing from the spirit of my invention. The scope of my invention is not to be restricted by the present description and examples which are merely illustrative of my invention.

I claim:

1. A process comprising coating a cement product with a composition comprising abietyl alcohol.

2. A process comprising impregnating an article composed of alkaline material with a composition comprising abietyl alcohol.

3. A process comprising impregnating marble with a composition comprising abietyl alcohol.

4. The process comprising impregnating marble with a composition comprising abietyl alcohol at a temperature of 90° to 125° C.

5. An article of manufacture comprising an article having an alkaline surface in intimate contact with a film comprising abietyl alcohol.

6. An article of manufacture comprising marble coated with a film comprising abietyl alcohol.

7. An article of manufacture comprising marble impregnated with abietyl alcohol.

8. An article of manufacture comprising a cement product coated with a film comprising abietyl alcohol.

9. An article of manufacture comprising an article having a film comprising abietyl alcohol in intimate contact with an underlying zinc surface.

10. A process comprising applying a composition comprising abietyl alcohol on the surface of an article having an alkaline surface.

11. A process comprising applying a composition comprising abietyl alcohol on the surface of marble.

12. A process comprising applying a composition comprising abietyl alcohol and a solvent on the surface of an article having an alkaline surface.

PAUL LA FRONE MAGILL.